United States Patent [19]
Heckel

[11] 3,934,716
[45] Jan. 27, 1976

[54] ORIENTATION ALIGNMENT APPARATUS FOR YARN COPS BEING SUPPLIED TO TEXTILE MACHINES

[75] Inventor: Réne Heckel, Horgen, Switzerland

[73] Assignee: Maschinenfabrik Schweiter AG, Horgen, Switzerland

[22] Filed: Oct. 25, 1974

[21] Appl. No.: 517,857

[30] Foreign Application Priority Data
Nov. 13, 1973 Switzerland.................. 15940/73

[52] U.S. Cl. .............. 198/252; 198/268; 198/282; 209/88
[51] Int. Cl.² ........................................ B65G 47/24
[58] Field of Search ........... 198/268, 288, 246, 252, 198/282, 236, 237, 238, 240, 244, 270; 209/88; 242/35.5, 35.6 E; 221/157, 158, 171

[56] References Cited
UNITED STATES PATENTS

| | | | |
|---|---|---|---|
| 3,018,888 | 1/1962 | Reiners et al. | 209/88 R |
| 3,031,059 | 4/1962 | Ingham, Jr. | 198/268 |
| 3,581,867 | 6/1971 | Alz | 198/288 |
| 3,797,640 | 3/1974 | Aidlin et al. | 198/288 |
| 3,853,215 | 12/1974 | Paiva | 198/236 |

*Primary Examiner*—Robert J. Spar
*Assistant Examiner*—James M. Slattery
*Attorney, Agent, or Firm*—Flynn & Frishauf

[57] ABSTRACT

To provide yarn cops to textile machines in predetermined, uniform alignment and orientation of the yarn cops, typically to supply yarn cops to spooling or spinning machines, the diameter of the core ends of the yarn cops is sensed and a difference signal obtained. This difference signal is stored, mechanically or electrically and, when a cop is required to be fed to the spinning machine, the stored difference signal is transferred to an orientation alignment apparatus, typically a pair of pins which retain the cop in horizontal position and, upon withdrawal of a selected one of the pins, permit the cop to drop into a delivery chute, selectively, with the selected end first, to deliver the cop in properly oriented alignment to the textile machine, that is, typically to the spooling or spinning machine.

20 Claims, 4 Drawing Figures

ORIENTATION ALIGNMENT APPARATUS FOR YARN COPS BEING SUPPLIED TO TEXTILE MACHINES

Cross reference to related patents and application:
U.S. Pat. No. 3,380,677
U.S. Pat. No. 3,608,843
U.S. Pat. Ser. 304,875, by the inventor hereof, filed Nov. 8, 1972, all assigned to the assignee of the present invention.

The present invention relates to an apparatus to coordinate the end-for-end orientation and alignment of yarn cops to supply the yarn cops to a textile machine, typically to a spooling or spinning machine in predetermined orientation.

Yarn cops, as supplied from a storage container and by a transport device are delivered to the spooling or spinning machine in random orientation. It has previously been proposed to determine the orientation of spinning cops by measuring the differences in diameter of the cores of the cops (see Swiss Pat. No. 454,691). One of the two ends of the core is sensed while the cop is pressed against a stop. A signal is derived representative of the distance of the outer circumference of the core from the stop, the signal controlling a subsequent orientation device. The orientation device has stop pins which can be moved out of the transport path and, by engaging the cop selectively, rotate or twist the cop to have a predetermined end-for-end orientation.

Spooled cops, on which yarn is stored, are not always identical and, in dependence on the structure of the core, the axis of the cop, that is, of the core, is not always parellel to the sensing or measuring plane. Thus, erroneous measurements may result. Due to skew of the cop, it is possible that the thicker end of the core is so located that it simulates the thinner end, that is, it becomes located in a position spaced from a sensing plane which is usually the position of the thinner end. The subsequent orientation device then receives an erroneous signal, and the yarn cop is erroneously aligned.

It is an object of the present invention to provide a system in which erroneous measuring results are essentially eliminated.

Subject matter of the present invention:

Briefly, the diameters of both ends of the cores are measured and a difference signal is derived which is representative of the difference between the core ends. The orientation device includes storage means which store the difference signal and, upon sensing of a control signal requiring delivery of a cop, control the orientation device to deliver the cop and to orient the cop in proper orientation.

The diameter of the two core ends is sensed independently of the yarn wound on the cop, or on the cop, or pirn construction; additionally, sensing of the differences of the two core ends eliminates any alignment difficulties of the cop in the measuring apparatus and renders the measurement independent of the position of the cop therein. A precise control signal for the subsequent orientation device can thereby be obtained. The structure of the present invention has the additional and substantial advantage that no specific adjustment of the apparatus is necessary when different sizes of cops are to be measured, since the controlling signal is a difference signal; any type of cop which is wound on cores having different diameters may be aligned and oriented by the apparatus of the present invention.

In accordance with a feature of the invention, the measuring system includes parallel jaws located in the transport path of the cops and so arranged that one pair of jaws engages one end of the core of the cop, and another pair of jaws engages the other end of the core of the cop, the two pairs of measuring jaws being coupled together and providing a difference signal which, depending on the orientation of the cop, will be either in one direction, or in the other. The direction of this difference signal is then utilized to control the orientation device.

The invention will be described by way of example with reference to the accompanying drawings, wherein.

Figure 1:
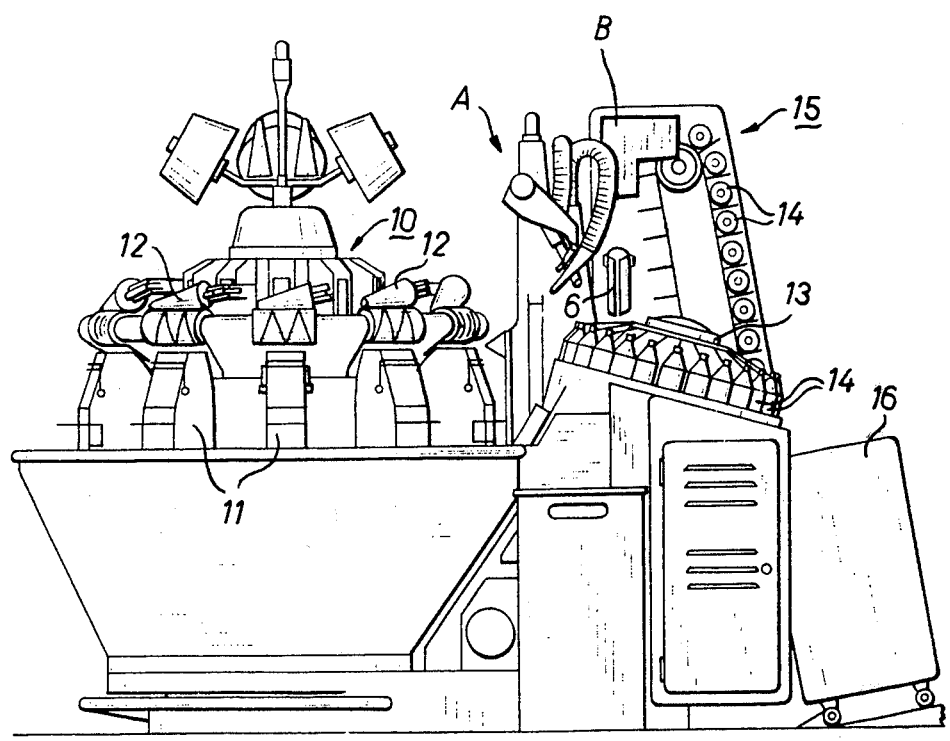
FIG. 1 is a perspective, highly schematic general view of an automatic cross spooling machine to which the present invention may be applied.

An automatic cross spooling machine (FIG. 1) has a turret, or rotatable table 10 on which a plurality of spooling positions 11 are located. Each one of the spooling positions 11 has means (not shown) to receive a yarn cop, from which yarn is wound on yarn packages 12. When the cops, supplying yarn to the packages 12 are empty, the turret 10 rotates and a new cop is placed in winding position at the respective spooling station 11. For further details of such a structure, which is well known, reference is made to U.S. Pat. No. 3,380,677.

New yarn is supplied from a yarn supply magazine 13 in which cops 14 are located, side by side. Suction means are located at the position A to receive free yarn ends, or pigtails, and to knot the yarn ends together so that the yarn packages 12 will have considerably more yarn wound thereon than the length of yarn on any one of the cops 14. The free yarn end from cop 14 is knotted to the terminal end of the yarn on the package 12.

The magazine 13 must be properly loaded. The system B provides the apparatus to properly orient the yarn cops, so that the yarn cops are supplied to the magazine 13 with proper orientation. It is this portion of the apparatus which forms the subject matter of the present invention. The individual yarn cops 14 are supplied to the apparatus B by a transport device 15, taking yarn cops, with random orientation, from a storage container 16.

A chute 6 is located between the apparatus B and the magazine 13, through which properly oriented cops 14 are delivered to the magazine 13. A device to remove the free yarn end from the cops being supplied to the magazine 13 may be located between the apparatus generally indicated at B in FIG. 1; such apparatus is not specifically shown nor described herein, and reference may be had to U.S. Pat. application Ser. 304,875, by the inventor hereof, and assigned to the assignee of the present application.

The apparatus, generally indicated at B in FIG. 1, includes, in general, a device to measure the relative diameters of the core ends and a subsequent apparatus responsive to the measuring result and to then orient the cops being delivered to the magazine 13 with a predetermined, uniform end-for-end orientation.

Figure 2:
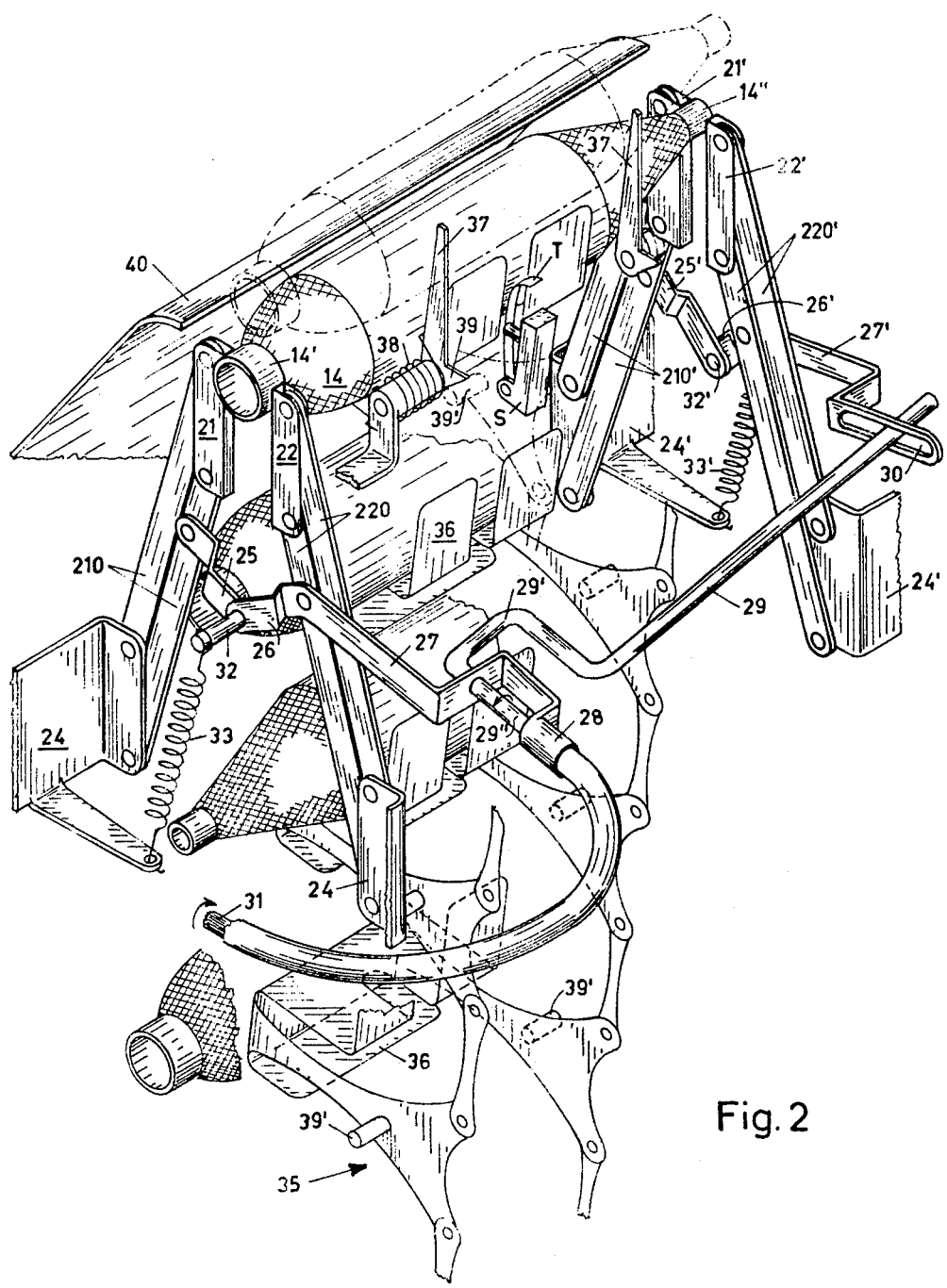
FIG. 2 is a perspective view of a measuring system to sense core diameters of the cops, showing a plurality of cops in a transport path.

FIG. 2 illustrates the measuring device of the apparatus B of FIG. 1. Generally, two pairs of measuring jaws 21, 22 and 21', 22' are located to engage the respective core ends 14', 14" of the cop 14. Each one of the jaws 21, 22 and 21', 22' is supported by the free ends of a parallelogram linkage 210, 220 and 210', 220'. Support brackets 24, 24a and 24', 24'a support the other ends of the parallelogram linkages 210, 220, 210', 220', respectively to obtain parallel movement of the measuring jaws 21, 22. The distance between the brackets 24, 24' and 24a, 24'a is preferably adjustable; these brackets are secured to a frame (not shown) of the transport device 15 (FIG. 1). Distance adjustment of the brackets 24, 24' and 24a, 24'a is preferably provided so that the jaws can be spaced properly to receive cores of different lengths. The associated parallelogram linkages 210, 220, and 210', 220' are connected together by offset links 25, 26, 25', 26', respectively. The offset links 26, 26' merge in a control arm 27, 27', respectively. The free end of the control arm moves upwardly, to provide a control movement, or control signal when the jaws 21, 22, 21', 22', respectively, approach each other. The control movement, or control signal is downward when the jaws are spread.

The free ends of the control arms 27, 27' are angled with respect to each other, and are connected together by means of a difference lever 29. As clearly shown in FIG. 2, arm 27 is double-angled, to make a general U-shaped bend to form a pivot 28 for the difference lever 29. The end 29' of the difference lever 29 in the double bend offset of the control arm 27 forms a pivot axis 29' of the lever. The angled portion of the control arm 27 is formed with a slit 30 in which the free and straight end of the difference lever 29 can pass.

Dissimilar change of the distance between the measuring jaw pairs 21, 22 and 21', 22' is transferred to form a pivoting movement of the difference lever 29 which can be sensed as a rotating signal at the outer end 29', forming the pivot axis of the lever 29. The rotary motion of the end 29' is a measure for the difference in distance between the two measuring jaw pairs 21, 22, and 21', 22', respectively. This signal, as will be described below, is used as a measuring result signal representative of difference of the diameters of the ends of the cores of the cops, and is used as a control signal for the orientation device, to be described. The control signal, in the form of rotation of the shaft end 29', is transferred to a flexible shaft 31, from the end of which the signal can be taken off in form of rotation of the shaft.

The common connection points 32, 32" of the levers 25, 26, and 26' are connected to a tension spring 33, 33', respectively, which is connected to a portion of the frame, for example to a projecting bracket from the side brackets 24, 24'. The springs, therefore, tend to bias the jaws of each of the measuring pairs towards each other.

A transport chain 35, which may be the same chain as the transport device 15 of FIG. 1, has extending brackets 35 to form holding cups, or holding projections for the cops 14. The cops 14 are transported by the chain 35 to a position between the measuring jaw pairs 21, 22 and 21', 22', respectively; they are then further transported to an ejection position where the cops are thrown on a slide 40 by means of an ejector 37. The ejector 37 and the slide 40 form portion of the orientation device, to be described.

The ejectors 37 are held in a rest or quiescent position by means of a spring 38. They are formed with an ejection projection 39 which extends into the path of movement of control pins 38' on the transport chain 35. A feeler T, engaging through a slit in the support brackets 36, operates a switch S which, if a cop 14 is missing from the respective support bracket 36 controls the drive motor for the transport chain 35 to start the transport chain. If the feeler T senses the presence of a cop, the transport chain is stopped, as will be described.

Figure 3:
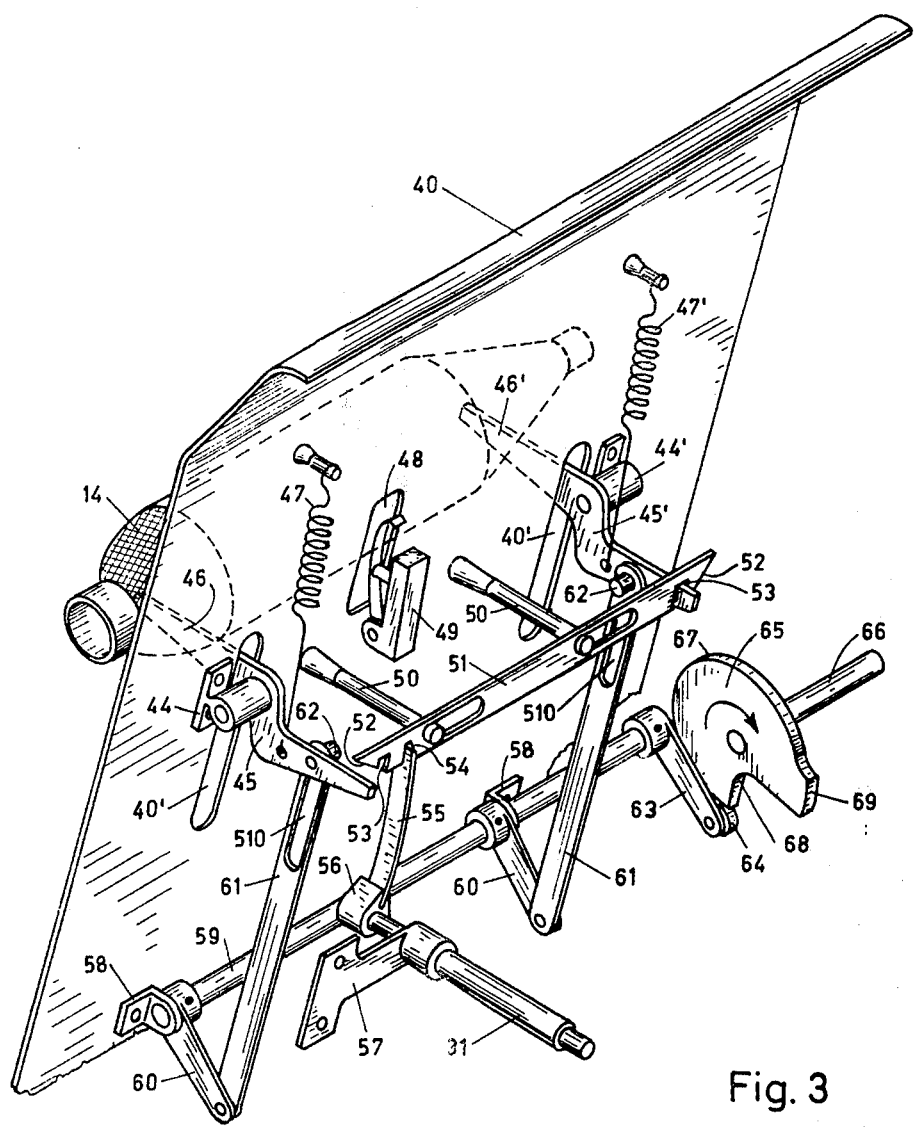
FIG. 3 is a perspective view of one embodiment of an orientation device, responsive to the control signal developed by the system of FIG. 2.

One embodiment of the orientation device is shown in FIG. 3. This orientation device orients the cops for delivery towards chute 6 (FIG. 1) by causing the cop to enter the chute with the one, or the other end first, in dependence on the rotary position of the shaft 31, that is, in dependence on the measured difference signal derived from the measuring jaws 21, 22 and 21', 22', respectively. The slide 40 forms part of the orientation device, and is again shown in full in FIG. 3.

The backside of the slide 40 (FIG. 3) has two bearings 44, 44' secured thereto in which double-armed levers 45, 45' are rotatably located. Lever arms 46, 46' extending through slits 40' in the slide 40 form support rods, or pins for the cop 14 which is ejected from the measuring device, as previously described. Tension springs 47, 47' engage the levers 45 and have the tendency to rotate the levers 45 in counterclockwise direction, that is, to disengage the support arms 46, 46' from engagement with cops 14. An opening 48 is located in the slide 40 in the region of a cop 14 — when supported on arms 46, 46'. A sensing switch 49 has a sensing blade which, when engaged by a cop 14, provides a signal indicative of presence of a cop. The sensing switch 49 which switches ON with some delay (as will be described) is in circuit with the chain drive for the transport chain 45, and parallel to the switch S of the measuring system described in connection with FIG. 2. A slider 51 is located on two spacer bars 50 secured to the backside of the slide 40. Slider 51 is formed at its ends with an inclined surface 52 and an open notch 53, into which the outer ends of levers 45, 45' may engage. Slider 51 is shorter than the distance between the levers 45, 45' so that at any time only one of the two levers can engage in the slider. The slider 51 is formed with an additional notch 54, in which a leaf spring 55 engages, the other end of which is secured to a hub 56. Leaf spring 55 forms a control lever and is secured to the flexible shaft 31, the rotation of which is controlled by the measuring device of FIG. 2. The non-rotary part, or jacket of the flexible shaft 31 is secured to the machine by a bracket 57 which, in turn, is suitably secured to the frame thereof. Rotation of the flexible core of flexible shaft 31, therefore, is transferred to leaf spring 55 to move, or to tend to move the lever 51 in the one, or the other direction; since two directions of movement are involved, the output may be expressed in binary terms, e.g. 0–1, assigning, for example, the 1 output to movement to the right.

A shaft 59 is journalled on two bearing brackets 58, 58', secured to the slide 40. Shaft 59 has two levers 60, 60', which are pivoted to reset links 61, 61'. Each one of links 61, 61' are formed with a slit 510 at their respective ends. Pins 62, 62' located inwardly of the free end of the respective levers 45, 45' engage in the respective slots 510. A third lever 63, also secured to shaft 59 has a cam follower roller at its free end, which is engaged by a cam track forming three control zones 67, 68, 69 on a cam disk 65. Cam disk 65 is secured to a shaft 66. The shaft 66 is connected to the yarn supply control system of the textile machine. If the textile machine signals that a new yarn cop is needed (for example when the magazine 13 has a free magazine position, as indicated by a feeler switch at the bottom of a yarn cop receiving chamber), then shaft 66 is rotated by 1 revolution, that is, 360°, in the direction of the arrow. Rotation may be effected, for example, by a single-revolution motor, by a clutch engaging a normally rotary shaft, for 1 revolution or the like. The three control zones or portions 67, 68, 69 of the cam disk 65 — with respect to the location of the levers 45, 45'— are sensed by the cam follower 64 and follower lever 63 upon rotation of shaft 66, and thus control movement of the reset links 61, 61', respectively.

In rest position — shown in FIG. 3 — lever 63 is engaged by the first control zone 67 of the cam disk 65. In this position, the reset links 61, 61' are moved all the way downwardly, so that the cop engagement or holding arms 46, 46' extend from slide 40 in approximately horizontal direction; a cop 14 may, therefore, be held on the arms 46, 46' and be retained thereon.

Operation: Upon receipt of a signal that a new cop is to be supplied, shaft 66 will begin to rotate in direction of the arrow (FIG. 3) and the cam follower lever 63 will drop into the subsequent control track zone 68. Shaft 59, therefore, will rotate in counter-clockwise direction and the reset links 61, 61' will move upwardly. That one of the levers 45, 45' which is not blocked by the locking slider 51 may rotate in counter-clockwise direction, due to the weight of the yarn cop thereon and under the assistance of the spring. The yarn cop will thus be released and drop downwardly, with that end first, or forward, which previously was supported on the lever arm 46 which is not engaged by the control or locking slider 51. The other one of the levers 45, or 45', respectively, which remains blocked in this phase by means of the locking or control slider 51 assists the cop on tipping to the respective desired side so that the cops, as desired, are properly oriented with respect to their end-for-end alignment.

Upon further rotation of shaft 66, and hence of the cam disk 65, the cam follower lever will be engaged by the reset zone 69. This causes shaft 59 to be extensively rotated in clockwise direction, thus pulling the reset links 61, 61' downwardly and, with it, pulling the levers 45, 45' downwardly. This movement of the levers 45, 45' in clockwise direction extends over an angle which is below that of the rest position (shown in FIG. 3) so that the levers 45, 45' will clear the control, or locking slide 51. The respective lever 45, 45' previously engaged in the notch 53 is thus released from locking engagement with the slider or rod 51. In this position, the signal from the shaft 31 can be transferred to the slider 51 to move the slider 51 into the desired direction, that is, to engage the respective lever 45, 45° depending on the orientation of the subsequent cop, being measured, upon return of the links 61, 61' to the position shown in FIG. 3. This return will occur upon further rotation of the shaft 66 and, consequently, of cam disk 65. Cam follower 63 will again reach the rest position or zone 67 of the cam track. The reset links 61, 61' will again reach the position shown in FIG. 3, that is, their rest position, in which the one, or the other one of the levers 45, 45' is engaged in the respective notch 53 of the control or locking slider 51.

The angular rotation of cam disk 65 over the control zone 68, 69 also forms a measure for the turn-on delay of the sensing switch 49.

Overall operation: Transport device 15 transports yarn cops from the supply 16 upwardly. The uppermost one of the cops 14 in the transport chain 35 (FIG. 2) will be transported, from below, between the measuring jaw pairs 21, 22 and 21', 22'. The measuring jaw pairs are spread apart upon further movement of the cops 14, that is, as they are being carried along by the transport chain 35. In the example shown in FIG. 2, the wider end of the core is between the jaw pair 21, 22; the narrower end is between the jaw pair 21', 22'.

Switch S in the circuit of the transport chain drive, in this position of cop 14, is open. This switch, however, is in parallel to switch 49 (FIG. 3). If there is no cop on the orientation device of FIG. 3, then switch 49 (FIG. 3) will close so that the transport chain drive 35 will be energized, and will continue to operate. Transport chain drive 35 will be stopped only when both switches S and 49 are open, that is, when a cop is present both in the measuring device as well as on the orientation device.

The measuring jaws 21, 22 are spread apart to a greater extent than the jaws 21', 22' (assuming the orientation of the cop of FIG. 2) so that the lever extension 27 receives a greater deflection (over levers 25, 26) than the lever extension 27 has received over its associated levers 25', 26'. As previously described in connection with FIG. 2, the difference lever 29 will provide a rotary output signal at its pivot end 29', in counterclockwise direction, indicative of the difference between the diameter of the core at the end 14'' and 14' of the cop 14.

The rotary movement of the shaft end 29'', as previously explained, provides the control signal for the orientation device described in connection with FIG. 3. Counter-clockwise rotation is transferred to the orientation device and signals thereto that the thicker core end is at the left side and that the thinner core end of the cop being measured is at the right side. If a cop which is rotated 180° end-over-end is located in the upper support bracket of the transport chain then, as is clearly apparent from FIG. 2, the difference lever 29 will provide rotary movement at its end in clockwise direction, so that the orientation device receives the opposite control signal.

The jaw pairs 21, 22 and 21', 22' are spread apart counter the direction of the reset springs 33, 33'. The angular offsets, as previously described, of the lever extensions 27, 27' increase the proportional movement of the difference lever, representative of the difference in spreading of the jaws of the pairs.

Rotation of the pivot end 29'' of the difference lever 29 is transmitted over the flexible shaft 31 to the leaf spring 35. Leaf spring 35 moves the locking or control slider 51 to the right from the position shown in the drawing, that is, it moves the slider from a central or null direction. Slider 51 then slides with its inclined surface 52 over the lever 45' and its notch 53' engages lever 45'. In the meanwhile, the transport chain 35 — which continued to operate — pushed the respective cop 14 through the measuring range of the measuring jaws (FIG. 2). The ejector 37, triggered by the respective ejector control pin 39' on the transport chain 35 ejects the respective cop 14 from its support on the transport chain 35 and moves it to the slide 40. Cop 14 drops on the arms 46, 46' of the levers 45, 45', respectively. The cop, initially, merely remains at rest on the levers, as seen in FIG. 3.

If the textile machine requires supply of a new yarn cop, shaft 66 is energized (for example by means of a magnetic clutch, a motor, or the like) for rotation, thus rotating the cam disk 65. Cam follower 63, as previously explained, drops into the first control zone 68, lifting the reset links 61, 61'. As clearly seen in FIG. 3, only the left one of the levers 45 can follow movement of the links 61 and pivot in counter-clockwise direction. The right lever 45' is held in fixed, locked position by means of the locking slider 51. The cop 14 thus tips with its free, thicker end about its support surface on the lever 46' in downward direction; so oriented, it is transported or delivered to the next station, for example into the chute 6 (FIG. 1). In the meanwhile, the levers 45 and 45', as well as the slider 51 revert to rest position. As previously described, the cam disk 65 has fully rotated about a complete revolution and, on the other hand, the measuring jaws (FIG. 2) have again closed after the cop has passed therethrough, and the flexible shaft 31 has returned to rest position (indicating no difference in the distance between the respective jaws of the pairs).

Switch 49, unloaded upon tipping of the yarn cop only closes the transport chain after a predetermined time delay; the previously described cycle may then repeat, that is, after measuring the orientation of the next yarn cop, described in connection with FIG. 2, the measuring results are stored by the position of the locking or control slider 51. The yarn cop is delivered to the orientation device in accordance with FIG. 3 and, when a new yarn cop is required, is delivered by freeing the orientation device upon request, that is, when a demand signal is received causing rotation of shaft 66 and hence of cam 65.

Figure 4:
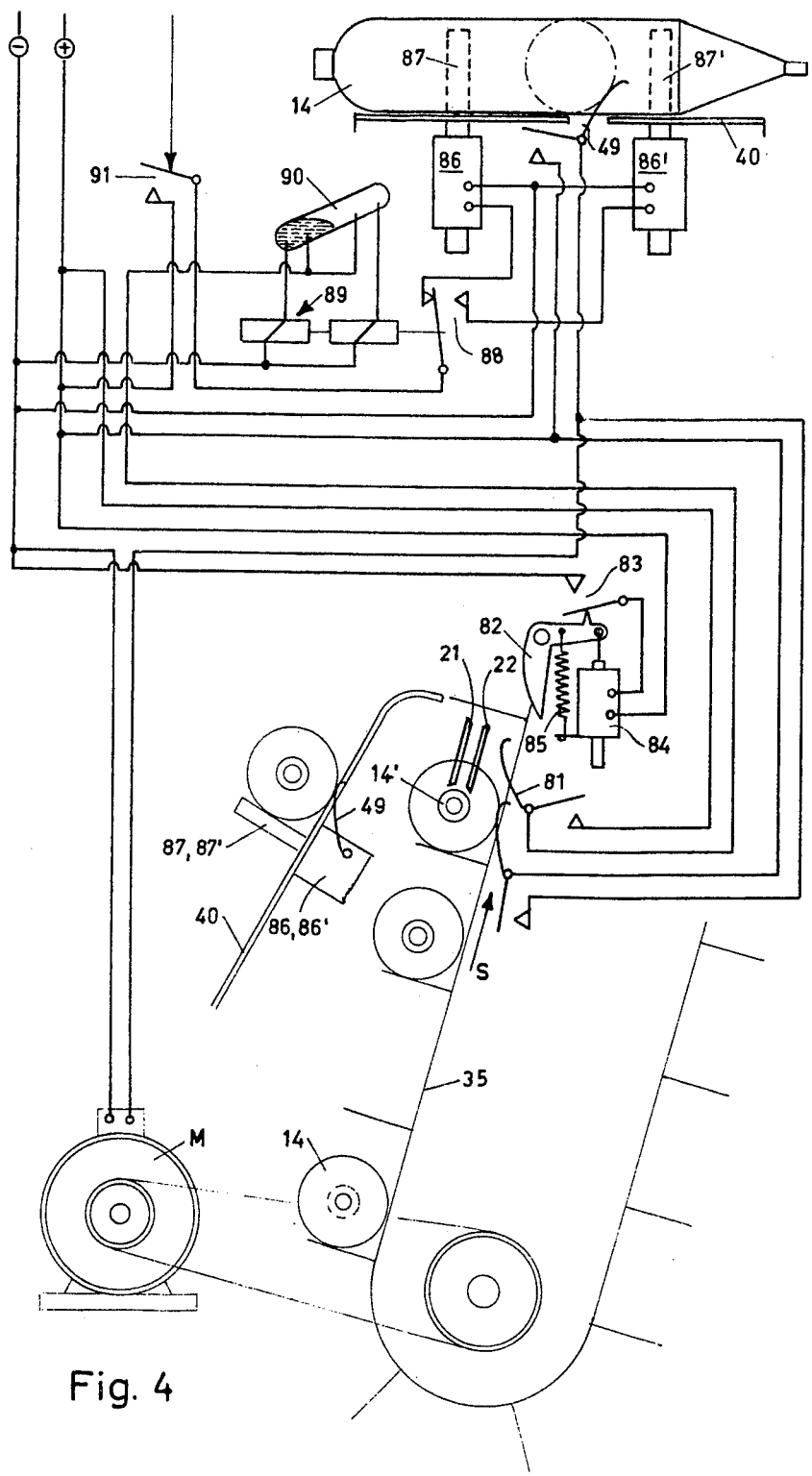
FIG. 4 is another embodiment of an orientation device, responsive to the control signal of FIG. 2.

FIG. 4 illustrates the circuit to be used in the system of the present invention, and additionally an electrically controlled cop release mechanism. Transport chain 35 is schematically shown; it is driven by a drive motor M and transports various cops 14, in upward direction, between the measuring jaws. Measuring jaws 21, 22 are schematically illustrated, ready to measure the smaller diameter 14' of the cop 14 being presented thereto. The arrangement of slide 40 with respect to the cops is likewise illustrated. Slide 40 is secured to the frame of the machine in a suitable manner. The electrical release mechanism 86, 86', 87, 87' essentially replaces the mechanical levers 45, 45' and arms 46, 46'. The circuit connection to operate the transport chain, and to sense presence of cops, is the same in the electrically controlled apparatus as well as in the mechanically controlled apparatus of FIG. 3.

Transport chain 35, driven by motor M, transports cops 14 to the measuring jaws 21, 22, 21', 22', as previously described. Switch S is located in advance of the position in which the core enters the measuring jaws. A second sensing switch 81 is provided, located in the measuring range of the jaws 21, 22. The third sensing switch 49 corresponds identically to the switch 49 of the embodiment of FIG. 3. This switch is preferably an OFF-ON-OFF pulse switch. All three switches, S, 81, and 49 are connected in parallel to the circuit of the motor M forming the drive for transport or conveyor chain 35. An ejector 82 is located at the inlet to slide 40, preferably formed as a double-armed lever which, displaced by a lifted cop 14, closes switch 83. Switch 83 is in circuit with a pull magnet 84. Spring 85 retains lever 82 in interfering position with respect to the transport path of the cops. Two electro-magnets 86, 86' are located at the backside of slide 40. Magnets 86, 86' have movable cores 87, 87' which penetrate the front face of the slide 40 and form bearings or support elements for the cops 14. Cores 87, 87' are held in the rest position, as shown in FIG. 4, by means of suitable springs (not shown). The two magnets may be alternatingly energized by means of a transverse switch 88. Selection of the operating direction, that is, the transfer engagement of switch 88, is provided by means of a dual relay 89, for example a differential relay, which is in turn energized, selectively, by a mercury tip switch 90. The position of the mercury tip switch 90 is determined by rotation of the flexible shaft 31 (FIG. 2) as schematically indicated. The transfer switch 88 is connected in series with a further switch 91 which is operated by the control apparatus of the textile machine, for example by the magazine 13, and is closed if a cop is required, as schematically indicated by the arrow P. Switch 91, when closed, responds to a "cop required" signal, applied by arrow P, similar to rotation of the cam disk 65, when a cop is required in the construction of the embodiment of FIG. 3.

Operation:

If either the switch S, or switch 49 closes, indicating that a cop is lacking in either the measuring apparatus, or in the orientation apparatus, or in both, the motor M is energized to start the conveyor chain 35. The signal indicating the differential width of the ends of the core of the cop, that is, the orientation signal is provided in identical manner to that described in connection with FIG. 2, and is transferred over the flexible shaft to the mercury switch 90. The mercury switch 90, upon tipping in the one, or other direction, energizes the respective windings of the bistable transfer relay 89, which operates the relay contacts 88. The required control pulse for relay operation is derived from switch 81 which responds upon passage of the cop through the measuring jaws. If the textile machine then requires a cop, switch 91 is closed temporarily to provide a pulse. In the illustrated example, this causes energization of the left magnet 86. The core which forms the cop support 87 is pulled in so that the respective cop is permitted to tip over the projected core 87', with its thicker end forward and to fall down the slide 40 and through the chute to the next station of the textile machine. Switch 49 is now released to again energize the motor M to supply a new cop 14 to the measuring jaws. This cop, likewise, by switch 81 provides a setting signal for the new position of the bistable relay 89, 88, in dependence on the measured or sensed position of the cop between the measuring jaws, which cause the respective rotation of the flexible shaft 31.

The cops are ejected from the conveyor chain 35 by first deflecting the lever 82, due to their presence, thus causing switch 83 to close. This energizes magnet 84 which pulls in its armature, again opening switch 84 and flipping lever 82 outwardly to eject the cop towards slide 40. The spring 85 retains the ejector arm 82 in the initial position.

Transfer of the measuring result, indicative of orientation of the cop, is again effected over shaft 31 and transmitted to the orientation device. Depending on rotation of shaft 31, the mercury switch 90 is tipped to the one side, or towards the other. Upon closing of switch 81 by a cop, which has just been measured, the respective coil 89 (depending on the direction of tip of mercury switch 90) is energized. The relay contact 88 is thereby pulled in the one or the other direction. The relay contact remains in this position, even after de-energization of the coils 89 (the relay being a "bistable" relay), thus storing the sensed orientation signal from the measuring jaw pairs. The position of the relay contact 88 remains stored until the "cop required" signal is received (closing of switch 91) whereupon the respective magnet 86, 86' responds, pulling in the respective core 87, 87' and thus delivering the cop thereon, with proper orientation, in the same manner as previously described in connection with FIG. 3, support levers 45, 45' with support arms 46, 46', respectively.

Various changes and modifications may be made within the scope of the inventive concept, and features described in connection with one embodiment may, similarly, be used with the other. The invention has been described, essentially, in connection with coil operated relays; electronic relays and solid-state devices may also be employed.

I claim:

1. Apparatus for coordinating the end-for-end orientation of spinning cops (14) for transport with proper end orientation to a textile machine having
  a transport means (15, 35) transporting spinning cops with random end-for-end orientation, and orientation means (46, 46'; 87, 87') to orient the cops to have a predetermined end-for-end orientation and to deliver the oriented, aligned cops to the textile machine,
  comprising
  spaced movable measuring means (21, 22; 21', 22'; 31) located in the transport path of the cops engaging the end portions of the cops to measure the diameters thereof;
  means coupled to the measuring means to provide a measuring result signal representative of the difference of the diameters, as measured, thereof;
  and control signal generating means (63-69; P, 91) applying said measuring result signal to the orientation means to effect delivery of a cop, in oriented alignment upon command of said control signal.

2. Apparatus according to claim 1, further comprising storage means (51–55; 88, 89, 90) connected to the measuring means and storing the measuring result signal;
  the control signal generating means (63–69; P, 91) being connected to said storage means to transfer the stored measuring result signal to the orientation means to effect delivery thereby of the cop, in oriented alignment.

3. Apparatus according to claim 1, wherein the measuring means comprises
  first gauging means (21, 22) sensing the diameter of one end (14') of the core of the cop;
  second gauging means (21', 22') sensing the diameter of the other end (14") of the core of the cop;
  comparison means (29) connected to both said gauging means and providing a difference signal having at least binary characteristics depending upon whether the first or second gauging means senses a larger core diameter than the other gauging means.

4. Apparatus according to claim 3, wherein said gauging means comprises parallel gauging jaws (21, 22; 21', 22') located in the path of transport of the cops and biassed towards each other, the jaws being spread apart by the respective ends (14', 14") of the cores of the cop (14);
  link means (25, 26, 27; 25', 26', 27') sensing spreading movement of the jaws of the first and second gauging means;
  a difference lever (29) connected to the links of both said gauging means;
  and means (31) sensing deflection of said difference lever upon differential movement of the respective jaws of the first and second gauging means.

5. Apparatus according to claim 4, further comprising a parallelogram linkage (210, 220; 210', 220') supporting said gauging jaws (21, 22; 21', 22') of the respective gauging means;
  the link means comprises linkages (25, 26, 27; 25', 26', 27') connecting said parallelogram link means;
  and the difference lever (29) being coupled to the lever deflection sensing means (31), said lever deflection means providing a mechanical position-variable output signal representative of change in position of said difference lever upon differential movement of said gauging jaws (21, 22; 21', 22').

6. Apparatus according to claim 4, further comprising storage means (51–55; 88, 89, 90) coupled to the difference lever deflection sensing means (31) and storing the measuring result of the gauging jaws, said storage means being connected to said orientation means to set the orientation means in a selected predetermined cop end-for-end orienting position.

7. Apparatus according to claim 6, wherein control signal generating means (63–69; P, 91), connected to the orientation means, effects release of the cop upon generation of the control signal from the orientation means, in the oriented position, as commanded by the measuring result signal transferred by the difference lever deflection sensing means (31).

8. Apparatus according to claim 5, wherein the link means comprises two spaced control arms (27, 27') extending transversely to the gap between the gauging jaws (21, 22; 21', 22')
  one of the control arms (27) forming a pivot journal for one end (29") of the difference lever (29), and the other arm (27') being formed with a slit (30) adjacent its free end, the difference lever (29) extending through the slit (30).

9. Apparatus according to claim 6, wherein the difference lever deflection sensing means comprises a flexible shaft (31) rotatably connected with the difference lever (29).

10. Apparatus according to claim 9, comprising a positioning slide (51) and a transfer lever (55), the transfer lever being connected to the flexible shaft (31).

11. Apparatus according to claim 9, wherein the orientation means includes electro-magnetically operated positioning elements (86, 87; 86', 87'), and the free end of the flexible shaft (31) is connected to an electrical switch in circuit with said electro-magnetic means.

12. Apparatus according to claim 11, wherein a tip switch (90) is provided, connected to the flexible shaft (31) to selectively energize the electro-magnetic means.

13. Apparatus according to claim 1, wherein the orientation means comprises support arms 45 45') selectively positionable in the path of movement of a cop (14) to the textile machine;

selective positioning of a respective support arm in interfering, or non-interfering position being controlled by the measuring result signal from said measuring means (21, 22; 21', 22'; 31).

14. Apparatus according to claim 1, wherein the orientation means comprises electro-magnetically retractable plunger means (87, 87') selectively positionable in the path of movement of a cop to the textile machine;

said electro-magnetically operated plungers being selectively retracted out of interfering position in said path of movement under command of the measuring result signal as determined by said measuring result signal as determined by said measuring means (21, 22; 21', 22'; 31)

15. Apparatus for orienting spinning cops (14) end-for-end to have uniform orientation, and for transporting the spinning cops with uniform orientation to textile machines comprising transport means (15, 35) transporting spinning cops with random end-for-end orientation;

two pairs of movable jaws (21, 22; 21', 22') located in the path of the cops and engaging respective ends of the cops;

a parallelogram linkage (210, 220; 210', 220') supporting said jaws and link means (25, 26, 27; 25', 26', 27') linking the jaws of each pair;

a difference lever (29) connected to the link means and changing position as determined by the relative spacing between the pairs of measuring jaws, and by its position providing an output signal representative of which one of the pairs of jaws are spaced farther apart than the other;

an orientation device (40, 46, 46'; 40, 87, 87') including a position storage means (55, 51; 90, 89) and spaced, selectively movable cop support means (46, 46'; 87, 87') in the transport path of the cops;

and signal transfer means (31) connected to the difference lever (29) and to the orientation device (40, 46, 46'; 40, 87, 87') to transfer the position signal representative of the particular position of the difference lever to the orientation device and to selectively control the cop support means for withdrawal of support from a cop at either, selective, spaced position and thereby orient said cop.

16. Apparatus according to claim 15, wherein the linkage means comprises two spaced control arms (27, 27') one control arm (27) being formed with a journal, the other control arm being formed with a slit (30);

a shaft element (29'') being formed at one end of the difference lever (29) and engaged into said journal of the one control arm (27), the other end of the difference lever (29) extending through the slit (30) of the other control arm (27').

17. Apparatus according to claim 2, wherein the signal transfer means (31) comprises a flexible shaft connected to the shaft portion (29'') of the difference lever (29).

18. Apparatus according to claim 17, further comprising an electrical switch connected to the free end of the flexible shaft (31).

19. Apparatus according to claim 15, wherein the orientation device (40, 46, 46') further comprises mechanically controlable support levers (45, 45'), connected to and supporting said cop support means (46, 46'), the position of said levers (45, 45') being controlled by the position signal from said signal transfer means (31).

20. Apparatus according to claim 5, wherein the orientation device (40, 87, 87') comprises electric solenoids (86, 87; 86', 87'), controlling the position of the cop support means (87, 87').

* * * * *